(No Model.)

J. B. CLEAVELAND.
WIRE STRETCHER.

No. 345,367. Patented July 13, 1886.

Witnesses:
H. P. Hood.
V. M. Hood.

Inventor:
John B. Cleaveland

UNITED STATES PATENT OFFICE.

JOHN B. CLEAVELAND, OF INDIANAPOLIS, INDIANA.

WIRE-STRETCHER.

SPECIFICATION forming part of Letters Patent No. 345,367, dated July 13, 1886.

Application filed October 20, 1885. Serial No. 180,385. (No model.)

*To all whom it may concern:*

Be it known that I, JOHN B. CLEAVELAND, a citizen of the United States, residing at Indianapolis, in the county of Marion and State of Indiana, have invented a new and useful Improved Wire-Stretcher, of which the following is a specification.

My invention relates to an improvement in that class of devices for straining the wires of a fence, in which a spindle is passed diametrically through a cylindrical tubular fence-post, and the wire is passed through an opening in the side of the post and secured to the spindle so as to be wound thereon within the post by the turning of the spindle.

The object of my improvement is to permit the automatic unwinding of the wire from the spindle when the wire is contracted by intense cold. Heretofore in this class of wire-straining devices the spindle has generally been secured unyieldingly against the retractive tendency of the wire.

The accompanying drawings illustrate my invention.

Figure 2:
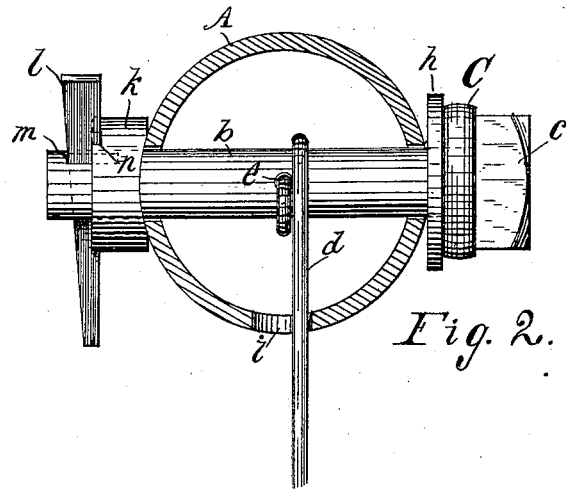
Figure 1:
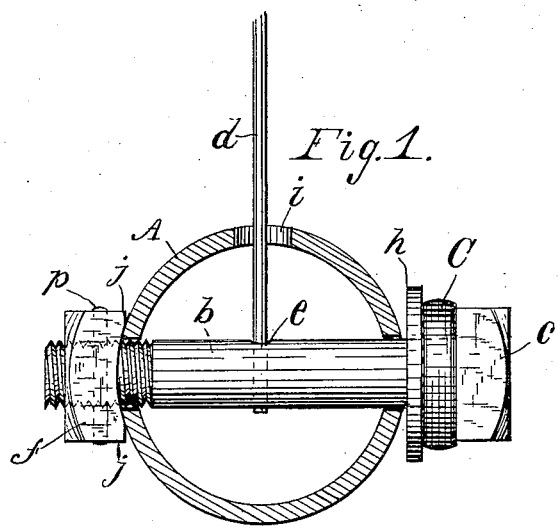

Figure 1 represents a transverse section of a tubular fence-post and a plan of my improvement. Fig. 2 is a modification of the same.

A is the post.

$b$ is a cylindrical spindle, having a fixed enlarged head, $c$, secured permanently thereto or formed integral therewith. Said spindle is provided at or about the middle of its length with a hole, $e$, to receive the end of the fence-wire $d$. Upon the end of the spindle $b$ opposite that having the fixed head $c$ is a nut, $f$, having one side made concave to fit the surface of the tubular post and arranged to have a limited movement longitudinally along the spindle until it reaches a point where the spindle is pierced to admit the pin $p$ or other suitable device, which serves to secure the said nut to the spindle, so that it may turn therewith. Said nut is preferably screw-threaded, in which case the spindle is screw-threaded to receive it, and it is secured to the spindle so as to turn therewith by a pin passed through the nut and bolt, as at $p$; or, instead of the nut $f$, there may be a collar, $k$, arranged to be moved along the spindle by a wedge-shaped key, $l$, passing through a slot, $m$, in the bolt and resting in a groove, $n$, in the collar to keep the collar from turning on the bolt. I prefer the nut.

C is a spring-washer, preferably of rubber, and $h$ is an ordinary metallic washer.

In operation, the washers C and $h$ are slipped over the spindle $b$, washer C being next the fixed head $c$. The spindle is then passed diametrically through the post in suitable openings. The nut or collar is then put upon the opposite end of the spindle and moved longitudinally thereon so as to compress the washer C, the concave side of said nut or collar engaging the post, and the washer C being sufficiently compressed to hold said nut or collar closely against the post. The nut or collar is then secured to the spindle so as to turn therewith either by means of a pin passed through said nut or collar and the bolt, as at $p$, or by the key $l$. The end of the fence-wire $d$ is now passed through the opening $i$ in the side of the post and hole $e$ in the spindle. A wrench is applied to the fixed head $c$ and the wire, previously fastened at the opposite end, is wound upon the spindle until sufficiently taut, washer C yielding to allow a longitudinal movement of the spindle as the corners $j$ of the nut come opposite the highest point on the post within their path of rotation, and expanding again so as to bring the curved side of the nut closely into engagement with the post when their curved surfaces coincide.

In the modification shown, Fig. 2 the collar $k$ is slipped over the bolt and drawn closely against the post by the key $l$, which also prevents the bolt from turning independently of the collar.

The friction between the nut, the opposed sides of the post, and washer $h$ is sufficient to prevent the spindle from turning under the ordinary strain of the wire; but when a greater strain is brought to bear—as the contraction of the wire due to intense cold—the washer C yields sufficiently to allow the spindle to turn until the strain is relaxed.

I claim as my invention—

The tubular fence-post, the spindle to receive and hold the end of a wire within the post, and having a fixed head and a nut, said nut having a concave side to fit the post, means for securing the nut to the spindle so as to turn therewith, and the elastic washer, all combined and arranged to co-operate substantially as and for the purpose specified.

Witnesses:         JOHN B. CLEAVELAND.

H. P. HOOD,
V. M. HOOD.